United States Patent [19]
Welschof

[11] 4,091,641
[45] May 30, 1978

[54] CONSTANT VELOCITY UNIVERSAL JOINT

[75] Inventor: Hans-Heinrich Welschof, Rodenbach, Germany

[73] Assignee: Uni-Cardan AG, Lohmar, Rheinland, Germany

[21] Appl. No.: 677,127

[22] Filed: Apr. 15, 1976

[30] Foreign Application Priority Data

Apr. 23, 1975 Germany .............................. 2517967

[51] Int. Cl.² .............................................. F16D 3/30
[52] U.S. Cl. .............................................. 64/21; 64/7; 64/8
[58] Field of Search ..................... 64/21, 8, 7

[56] References Cited

U.S. PATENT DOCUMENTS

| | | | |
|---|---|---|---|
| 2,640,335 | 6/1953 | Wingquist | 64/21 |
| 3,125,870 | 3/1964 | Orain | 64/21 |
| 3,802,221 | 4/1974 | Kimata | 64/21 |
| 3,942,335 | 3/1976 | Orain | 64/21 |

*Primary Examiner*—Allan D. Herrmann
*Assistant Examiner*—R. C. Turner
*Attorney, Agent, or Firm*—Edmund M. Jaskiewicz

[57] ABSTRACT

A constant velocity universal joint has an outer joint member which has an annular cavity therein with pairs of opposed grooves in the opposing surfaces of the annular cavity. A tubular inner joint member is disposed within the annular cavity and has a plurality of openings in which are positioned a plurality of torque transmitting elements. The torque transmitting elements have spherical portions which guide the element within an opening.

7 Claims, 5 Drawing Figures

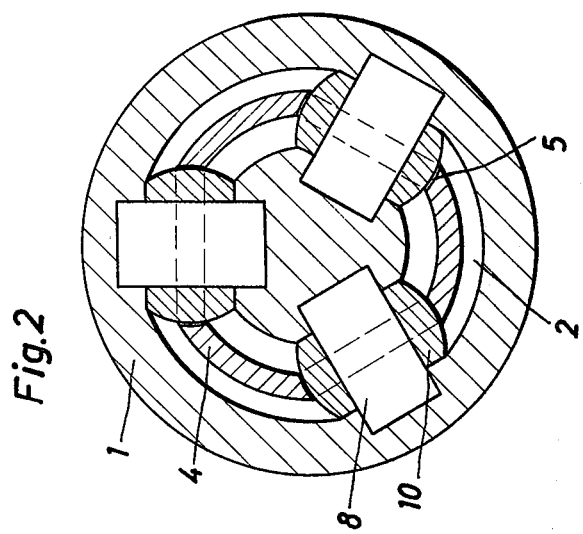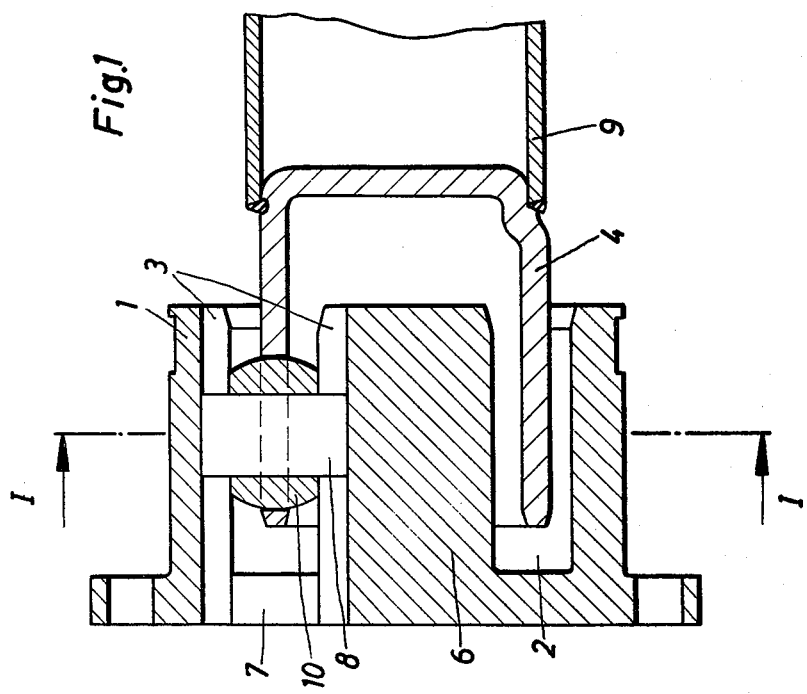

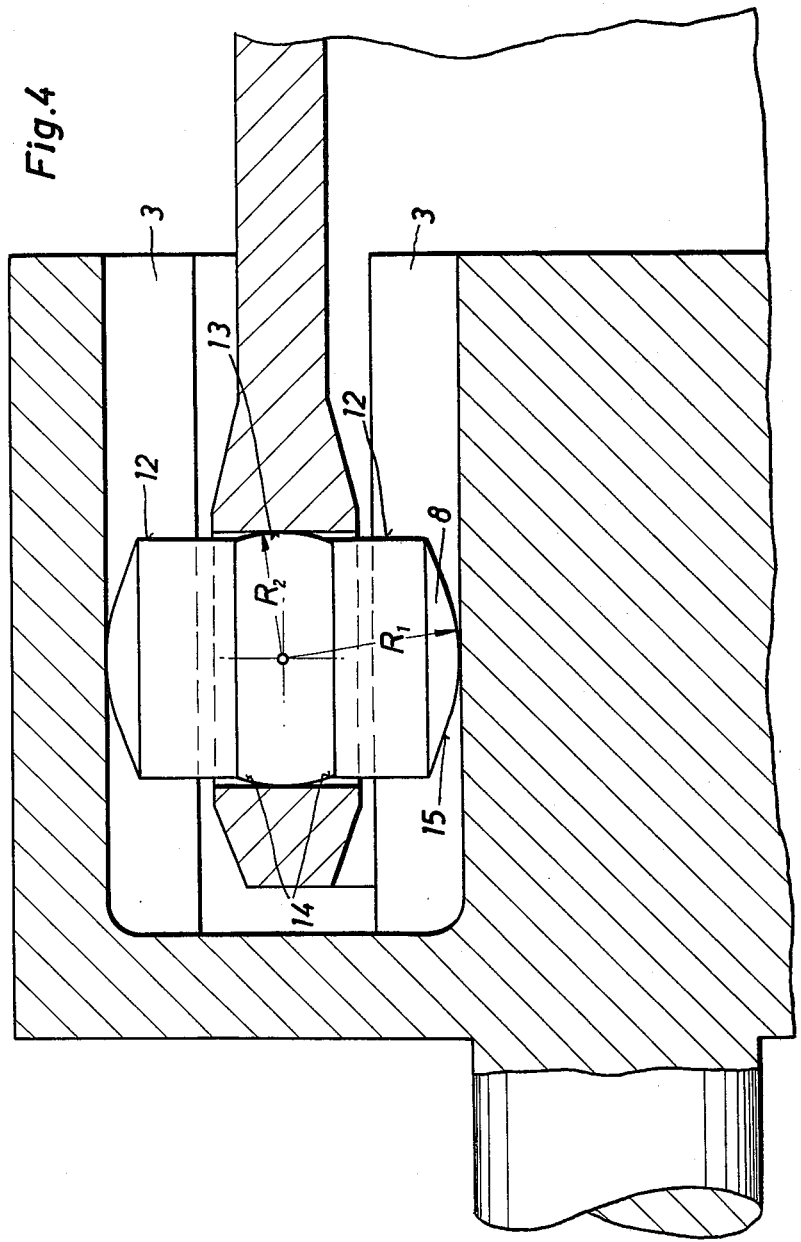

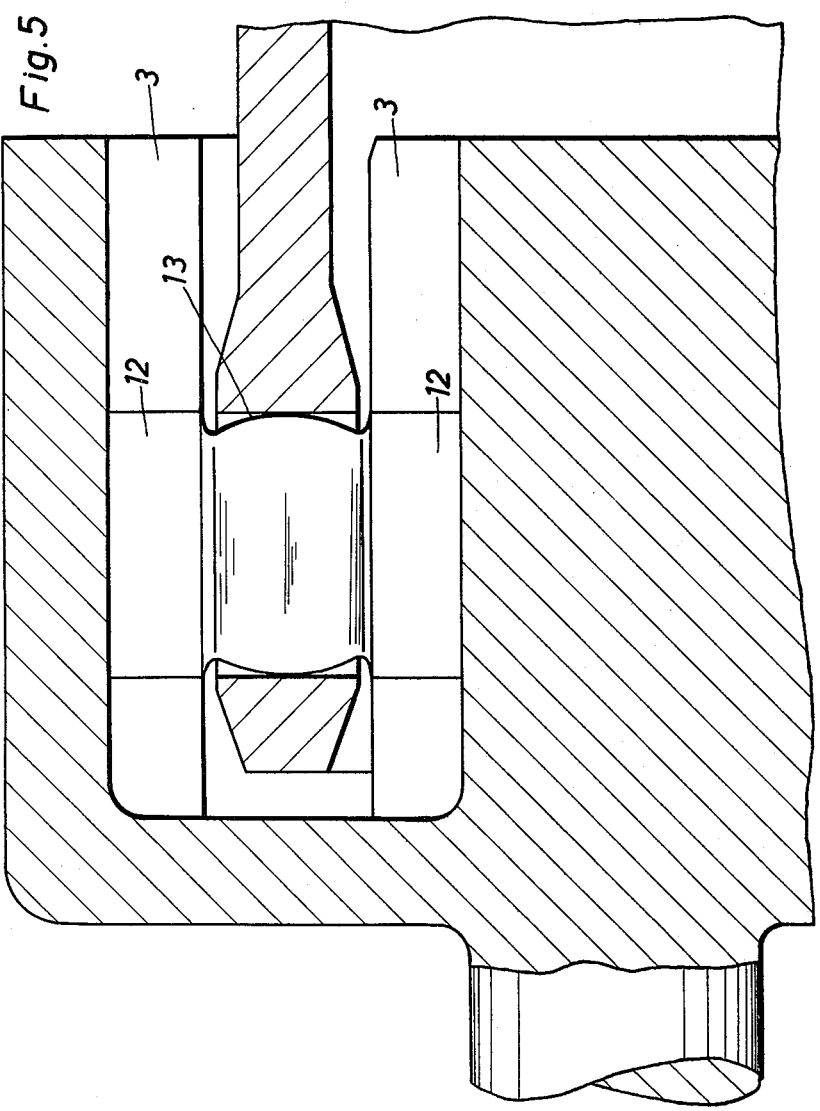

CONSTANT VELOCITY UNIVERSAL JOINT

The present invention relates to a constant velocity universal joint, more particularly, to the elements used for the transmission of torque between outer and inner joint elements.

One form of a constant velocity universal joint comprises an outer joint element having an annular cavity and three axially extending parallel grooves in the inner surface of the element and in the central cylindrical portion within the element to define the annular cavity. Three torque transmitting elements are positioned in the opposed grooves and are uniformly distributed in the peripheral direction. The torque transmitting elements are guided in openings of a tubular inner joint element disposed in the annular cavity of the outer joint element. One such universal joint is disclosed in the German published Pat. No. 2,225,499.

Such joints have the disadvantage of the sliding movement between the balls used for the transmission of torque and the joint elements that are in contact with the balls. This sliding movement produced a high friction which resulted in high temperatures in the joint. In addition, the torque transmission balls suffered damage and even were destroyed as a result of the vibratory forces produced at the high rotational speeds encountered in motor vehicles.

It is therefore the principal object of the present invention to provide an improved constant velocity universal joint of the type described above.

It is another object of the present invention to provide such a joint having increased torque transmitting capacity, reduced generation of heat and improved efficiency.

According to one aspect of the present invention such a constant velocity universal joint as described above is provided with torque transmitting elements each of which has a spherical portion which is positioned within the openings of the inner joint element and also cylindrical portions with which the torque transmitting elements are positioned in the opposed grooves. As a result of this structure, the torque transmitting elements are supported on cylindrical surfaces in both sets of guide grooves. This produces an advantageous distribution of the load being transmitted.

Other objects and advantages of the present invention will be apparent upon reference to the accompanying description when taken in conjunction with the following drawings, which are exemplary, wherein;

FIG. 1 is a longitudinal sectional view of a constant velocity universal joint incorporating the present invention;

FIG. 2 is a sectional view taken along the line I—I of FIG. 1;

FIG. 4 is a longitudinal sectional view in enlarged scale of a portion of the joint of FIG. 1 for showing a modification in the torque transmitting elements; and, FIG. 5 is a view similar to that of FIG. 4 and showing a further modification.

Proceeding next to the drawings wherein like reference symbols indicate the same parts throughout the various views a specific embodiment and modifications of the present invention will be described in detail.

Figure 3:
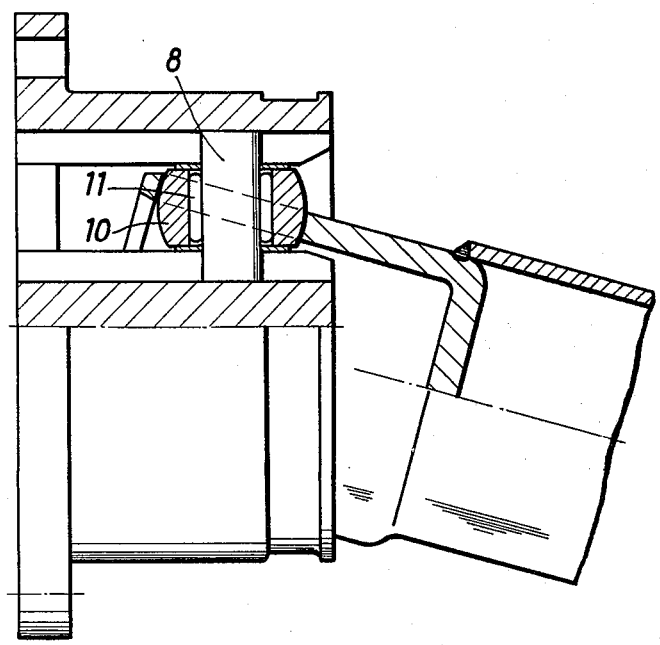
FIG. 3 is a view similar to that of FIG. 1 but showing a bending between the joint elements and further showing a modification of the torque transmitting element wherein needle bearings are employed.

In FIGS. 1 and 2 there is shown a constant velocity universal joint having an outer joint element 1 having a cylindrical member 6 extending from one end thereof to define an annular cavity 2 between the outer surface of the cylindrical member 6 and inner surface of the outer joint member 1. Three pairs of opposed grooves 3 are provided in the inner surface of the outer joint member 1 and the outer surface of the cylindrical member 6. The grooves 3 are axially extending and are parallel and each has an opening 7 on the flange end of the outer joint member 1 to permit the insertion of a tool required for forming the grooves 3 so as to facilitate the manufacture thereof.

A tubular inner joint member 4 is positioned within the annular cavity 2 and has three cylindrical openings 5 uniformly distributed about its periphery. Torque transmitting elements 8 are retained in the openings 5 with each element 8 being positioned in a pair of opposed grooves 3. A hollow or tubular shaft 9 is attached to the inner joint element and may function as a drive shaft or for the transmission of torque.

The torque transmitting elements 8 are in the form of a pin the ends of which are disposed in opposed grooves. Rotatably positioned around the element 8 is a roller 10 having an outer spherical surface which is guided within the cylindrical opening 5 of the inner joint member.

Upon angular displacement of the inner joint element 4 with respect to the outer element 1 an angular movement occurs between the inner joint element 4 and spherical rollers 10. Further, the pin shaped cylindrical ends of the element 8 will roll in the grooves 3. Radial movements around the axis of rotation occuring in the bent joint are compensated between the cylindrical openings 5 and the spherical rollers 10. When the torque transmitting elements have the form of cylindrical pins 8 with rollers 10 mounted thereon sliding movement between the elements 8 and grooves 3 is eliminated.

The movements of a bent rotating universal joint are thus divided into a rolling of the pins 8 in the guide grooves 3 and a turning of the pins in the bores of the spherical rollers 10.

In the modification of FIG. 3, an anti-friction needle-bearing 11 is positioned in the bore of the spherical roller 10 for decreasing frictional forces between the roller 10 and the cylindrical torque transmitting elements 8.

In FIGS. 4 and 5, the torque transmitting elements 8' are of one piece and each element has a cylindrical portion 12 at each end which enables the elements to roll in the guide grooves 3. In the area of the opening 5, each element has a spherical portion 13 as shown in FIG. 5 or a conical portion 14 as shown in FIG. 4. The end surfaces of the torque transmitting elements 8 are curved at 15 as shown in FIG. 4 in order to prevent any twisting of the elements during bending of the universal joint.

It is apparent that in the universal joint of the present invention angular movement will occur on the outer periphery of the roller 10 and the cylindrical opening 5 of a tubular inner joint element 4. Radial movement similarly is absorbed in the openings 5 of the inner joint element.

Thus it is apparent that the present invention has disclosed improved torque transmitting elements for a constant velocity universal joint of the form to which this invention relates.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint element having an axial bore therein, a central axial cylindrical member within said bore and defining with said joint element an annular cavity therebetween, a plurality of axially extending parallel grooves in the surface of said bore and the surface of said cylindrical member to define pairs of opposed grooves, a tubular inner joint element within said annular cavity and having a plurality of openings therein, a plurality of torque transmitting elements in said openings and each torque transmitting element being in a pair of opposed grooves, said torque transmitting elements each having a spherical portion guiding said element within a said opening, said torque transmitting elements further each having cylindrical portions positioned in said grooves to roll therein upon bending of the joint during rotation.

2. A constant velocity universal joint as claimed in claim 1 wherein there are three grooves in each of said bore surface and said cylindrical member and a corresponding number of openings and torque transmitting elements.

3. A constant velocity universal joint as claimed in claim 1 wherein said torque transmitting elements each comprises a pin with cylindrical portions in said grooves, and a roller on said pin and having an outer spherical surface.

4. A constant velocity universal joint as claimed in claim 3 and anti-friction bearing means between said roller and said pin.

5. A constant velocity universal joint as claimed in claim 1 wherein said torque transmitting element comprises a pin having cylindrical portions in said grooves and a spherical portion positioned within said opening.

6. A constant velocity universal joint as claimed in claim 1 wherein said torque transmitting element comprises a pin having cylindrical portions in said grooves and a conical portion positioned within said opening.

7. A constant velocity universal joint as claimed in claim 6 wherein the ends of said pin are curved.

* * * * *